United States Patent [19]

Southwick et al.

[11] Patent Number: 4,458,755

[45] Date of Patent: Jul. 10, 1984

[54] PROCESS FOR PREPARING ALKALINE FLOODING SOLUTIONS THAT AVOID SILICA DISSOLUTION

[75] Inventors: Jeffrey G. Southwick; Richard C. Nelson, both of Houston, Tex.

[73] Assignee: Shell Oil Company, Houston, Tex.

[21] Appl. No.: 492,319

[22] Filed: May 6, 1983

[51] Int. Cl.³ .............................................. E21B 43/25
[52] U.S. Cl. ............................... 166/250; 166/305 R; 252/8.55 R
[58] Field of Search ............... 166/252, 275, 250, 270, 166/305 R; 252/8.55 R, 8.55 D, 8.55 B

[56] References Cited

U.S. PATENT DOCUMENTS

| | | | |
|---|---|---|---|
| 3,805,893 | 4/1974 | Sarem | 166/270 |
| 3,871,452 | 3/1975 | Sarem | 166/270 |
| 3,920,074 | 11/1975 | Sarem | 166/274 |
| 3,927,716 | 12/1975 | Burdyn et al. | 166/270 |
| 4,081,029 | 3/1978 | Holm | 166/270 |
| 4,141,416 | 2/1979 | Holm | 166/275 X |
| 4,359,093 | 11/1982 | Bernard | 166/274 |

Primary Examiner—Stephen J. Novosad
Assistant Examiner—Bruce Kisliuk

[57] ABSTRACT

In injecting an aqueous alkaline liquid to displace an acidic oil within a subterranean reservoir, damage due to dissolving silica in or around a well is avoided by providing the alkaline solution with an amount of soluble silicate particularly suited for the reservoir conditions.

4 Claims, 6 Drawing Figures

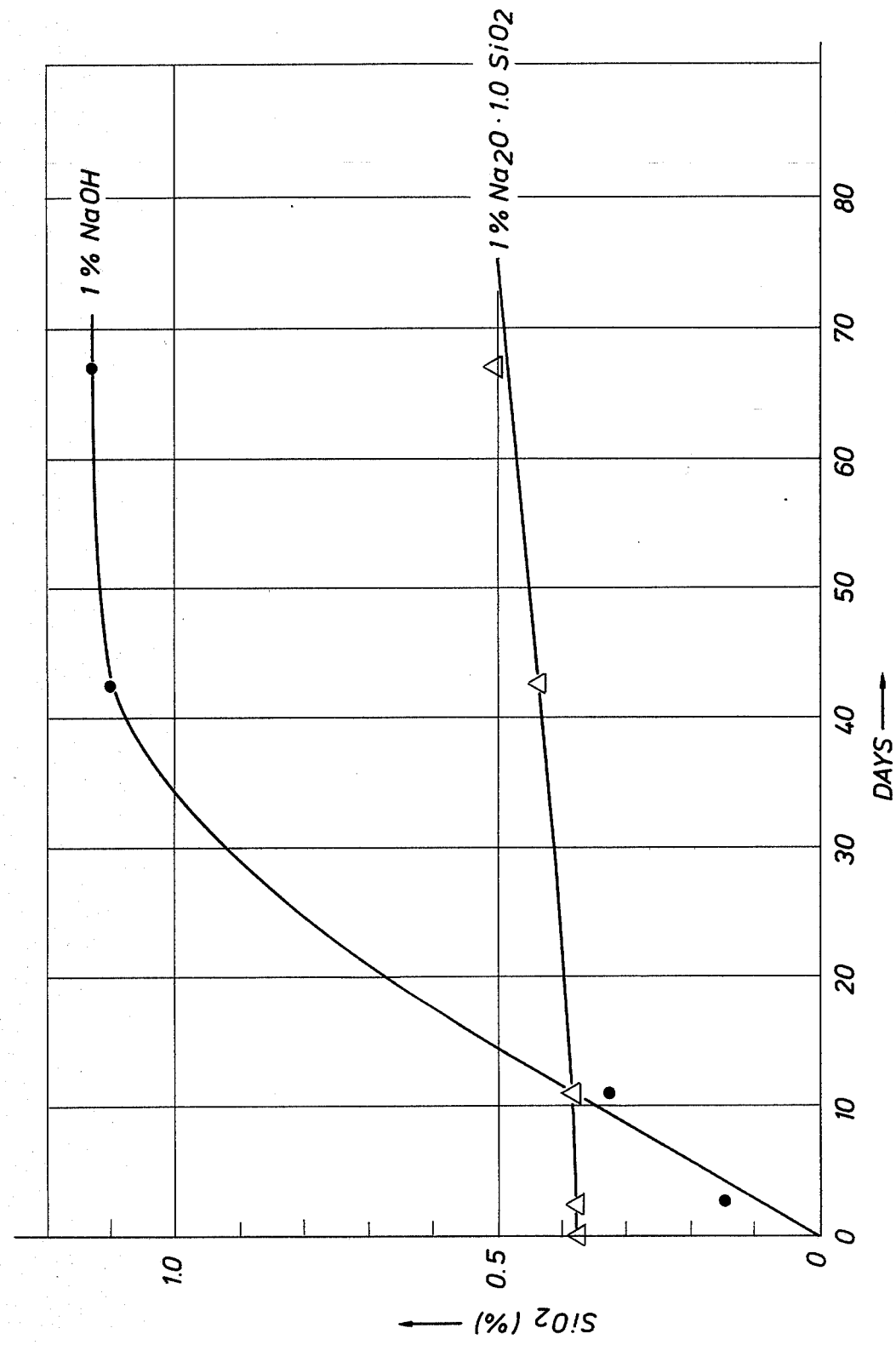

PROCESS FOR PREPARING ALKALINE FLOODING SOLUTIONS THAT AVOID SILICA DISSOLUTION

BACKGROUND OF THE INVENTION

The present invention relates to the preparation and use of aqueous alkaline solutions for displacing a relatively acidic oil within a subterranean reservoir to recover the oil or at least displace it within the reservoir. More particularly, the invention relates to proportioning the components of such a solution to reduce the tendency for the solution to dissolve silica without significantly reducing the oil displacing efficiency of the solution.

Numerous processes involving injections of oil-displacing aqueous alkaline solutions into subterranean reservoirs are described in U.S. patents. For example, U.S. Pat. No. 3,777,817 describes a pretreatment injection of a solution of sacrificial material, such as sodium hydroxide or sodium silicate, into a reservoir in which such "sacrificial materials" do not themselves have any appreciable effect on the oil recovery efficiency of waterflooding operations" (Col. 3, lines 37-39). U.S. Pat. No. 3,805,893 describes injecting alternating slugs of aqueous alkali silicate solutions which are capable of saponifying the reservoir oil and slugs of reactants which are capable of precipitating or gelling the silicate solutions. U.S. Pat. No. 3,871,452 describes a process like that of the 3,805,893 patent in which an aqueous sodium hydroxide solution is injected ahead of the alternating slugs. U.S. Pat. No. 3,871,453 describes a process like that of the 3,805,893 patent in which a slug of crude oil emulsified with an aqueous silicate solution is injected ahead of the alternating slugs. U.S. Pat. No. 3,920,074 describes a process of recovering oil by injecting the slug of aqueous alkali metal silicate ahead of flood water in order to displace oil which is restricting the rate at which the flood water can be injected. U.S. Pat. No. 3,927,716 describes recovering oil by injecting an aqueous alkaline solution having a specified range of pH and of monovalent salt content. U.S. Pat. No. 4,081,029 describes recovering oil by injecting a relatively large slug of aqueous alkali metal silicate solution having a relatively high pH ahead of alternating slugs of the type described in U.S. Pat. No. 3,805,893. U.S. Pat. No. 4,359,093 describes recovering oil by injecting an aqueous solution of alkali metal silicate containing an aminopolycarboxcylic acid chelating agent.

Copending patent application, Ser. No. 411,779 filed Aug. 26, 1982, by D. R. Thigpen, J. B. Lawson and R. C. Nelson describes recovering oil by injecting an aqueous alkaline solution containing a preformed cosurfactant material for increasing the salinity tolerance of the solution and an agent for controlling the rates at which the solution components are propagated through the pores of the reservoir.

SUMMARY OF THE INVENTION

The present invention relates to preparing an aqueous alkaline solution to be injected into a relatively hot subterranean reservoir for displacing relatively acidic oil through pores of the reservoir without dissolving a significant proportion of siliceous solids from within the borehole or the reservoir. Determinations are made of the reservoir temperature and the minimum pH needed to convert most of the petroleum acids contained in the reservoir oil to alkali metal salt. Determinations are made of the alkalinity required to satisfy consumption of alkalinity due to chemical reaction with the reservoir oil, brine, and mineral materials in the reservoir, exclusive of the consumption by silica dissolution. Then, determinations are made of the concentration and the alkali metal oxide to silicon dioxide ratio of alkali metal silicate needed to (1) provide said minimum pH (2) satisfy said consumption of alkalinity due to reactions other than silica dissolution and (3) reduce silica dissolution at the reservoir temperature. The aqueous alkaline solution to be injected into the reservoir is prepared so that it consists essentially of water and said determined concentration and alkali metal oxide to silicon dioxide ratio of dissolved alkali metal silicate.

The term "alkalinity" is used herein to refer to hydroxide ions and chemicals which react with water to form hydroxide ions. The determined concentration and ratio of alkali metal oxide to silicon dioxide can be formed by mixing a water-soluble alkali metal silicate with an alkali metal hydroxide.

BRIEF DESCRIPTION OF THE DRAWINGS

FIG. 6 shows a plot of time versus the concentration of silicon, expressed as $SiO_2$, in the aqueous alkaline solutions in static contact with sand at 74° C.

DESCRIPTION OF PREFERRED EMBODIMENTS

Figure 1:
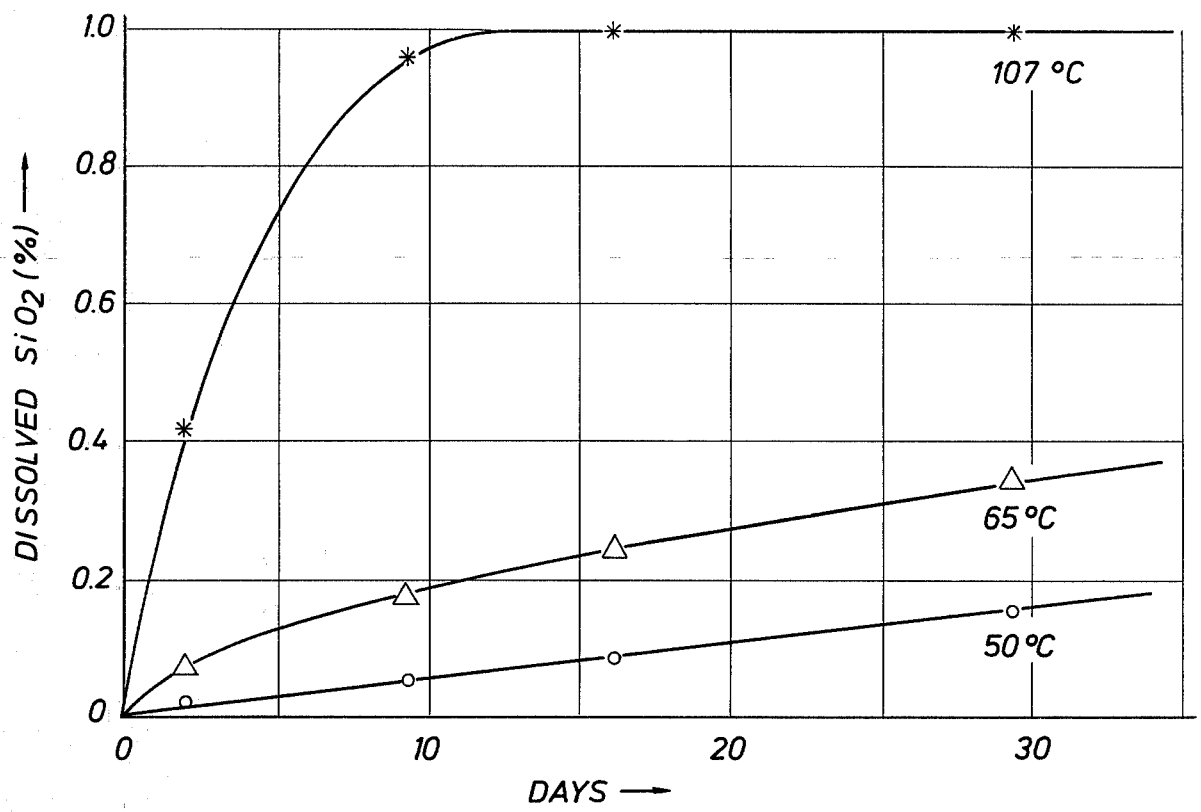
FIG. 1 shows a plot of time versus the concentration of silicon, expressed as $SiO_2$, in the aqueous sodium hydroxide solution which is in static contact with sand at the indicated temperatures.

One of the major problems encountered in an aqueous alkaline flood oil recovery process is the tendency for the solution to dissolve silica from earth formations in the borehole or reservoir, such as siliceous reservoir minerals and/or gravel or sand packs in the borehole of a well. This is a particularly troublesome problem regarding Gulf Coast reservoirs where the reservoir sands are relatively poorly consolidated and the reservoir temperatures range from about 60° to 107° C. (140° to 225° F.). In such relatively hot reservoirs the dissolving of the silica from in or around the well borehole is apt to form cavities that increase the lateral stresses and are apt to result in casing failures.

As indicated in prior patents, such as U.S. Pat. No. 3,927,716, it is known that for efficient oil recovery the pH of an aqueous alkaline solution should be in a relatively high range of from about 11 to 13. As indicated in patents such as U.S. Pat. No. 3,805,893 and the patents related to it, where an alkali metal silicate is used to provide some or all of the alkaline component of an aqueous alkaline solution, the orthosilicate has previously been used because it has a relatively high ratio of sodium oxide to silicon dioxide and provides a relatively high pH aqueous solution. However, since the relatively high pH solutions provided by sodium hydroxide or sodium ortho silicate react chemically with solid siliceous materials, particularly when such materials are contacted at relatively high reservoir temperatures, aqueous alkaline flooding processes have been restricted largely to low and medium temperature reservoirs.

The present invention is, at least in part, premised on a discovery that an undesirably high rate of silica dissolution in a relatively hot reservoir can be prevented without lowering the pH of the solution by an amount which significantly reduces the efficiency of the solution as an oil displacing agent. This effect can be accomplished by dissolving in the solution enough silicon dioxide to saturate the solution with respect to the dissolving of silica at the reservoir temperature.

Unobviously, the amount and type of dissolved sodium silicate which is needed for the solution to have such an equilibrium can be determined by means of static tests. Static tests of such an effect have been found to provide results in agreement with the much more costly testing procedures of measuring the amounts of silica dissolved by flowing the solution through a silica-containing sand pack or core.

Unless otherwise indicated the data referred to in the following figures and tables were obtained by static bottle tests of the dissolving of silica by various aqueous alkaline solutions in static contact with 100-mesh size pure sand (Clemtex No. 5). In such tests measured amounts of a sample of the solution are mixed with sand and maintained at the specified temperature. Aliquot portions of the solutions are sampled and analyzed for silicon concentration at different times.

FIG. 1 shows the results of such tests where the aqueous alkaline solution was a 1% by weight solution of sodium hydroxide in distilled water. The data show that, for such solutions in static contact with silica sand, the amount of sand dissolved depends on temperature, and that after a certain period of time an equilibrium condition is reached after which no significant additional dissolution of silica occurs. For example, at 107° C. such an equilibrium is attained in about 12 days.

It should be noted that when an aqueous alkaline solution is injected into a siliceous reservoir the inflowing solution does not attain an equilibrium condition in the near well portion of the reservoir, since fresh portions of the solution are being continuously injected. Thus, the rate of silica dissolution near the wellbore will remain relatively high, resulting in the probable formation of a cavity.

A series of aqueous alkaline solutions A through D were blended by mixing distilled water, sodium hydroxide and sodium silicate of 1.6 sodium oxide to silicon dioxide ratio. The concentration of the resulting sodium silicate solutions, the molar ratio of sodium oxide to silicon dioxide, the pH, and the percent by weight of silicon dioxide contained (in the form of dissolved sodium silicate) in each of the solutions is listed in Table 1.

TABLE 1

| Solution Concentration | MOLAR RATIO | | pH | Percent Dissolved SiO$_2$ (calculated) |
|---|---|---|---|---|
| | Na$_2$O | SiO$_2$ | | |
| (A) 2.25% | 1 | .8 | 13.20 | 1.0 |
| (B) 1.25% | 1 | .5 | 13.18 | .41 |
| (C) 1.0% | 1 | 1 | 12.70 | .5 |
| (D) 2.0% | 1 | 1.6 | 12.54 | 1.23 |

Figure 2:
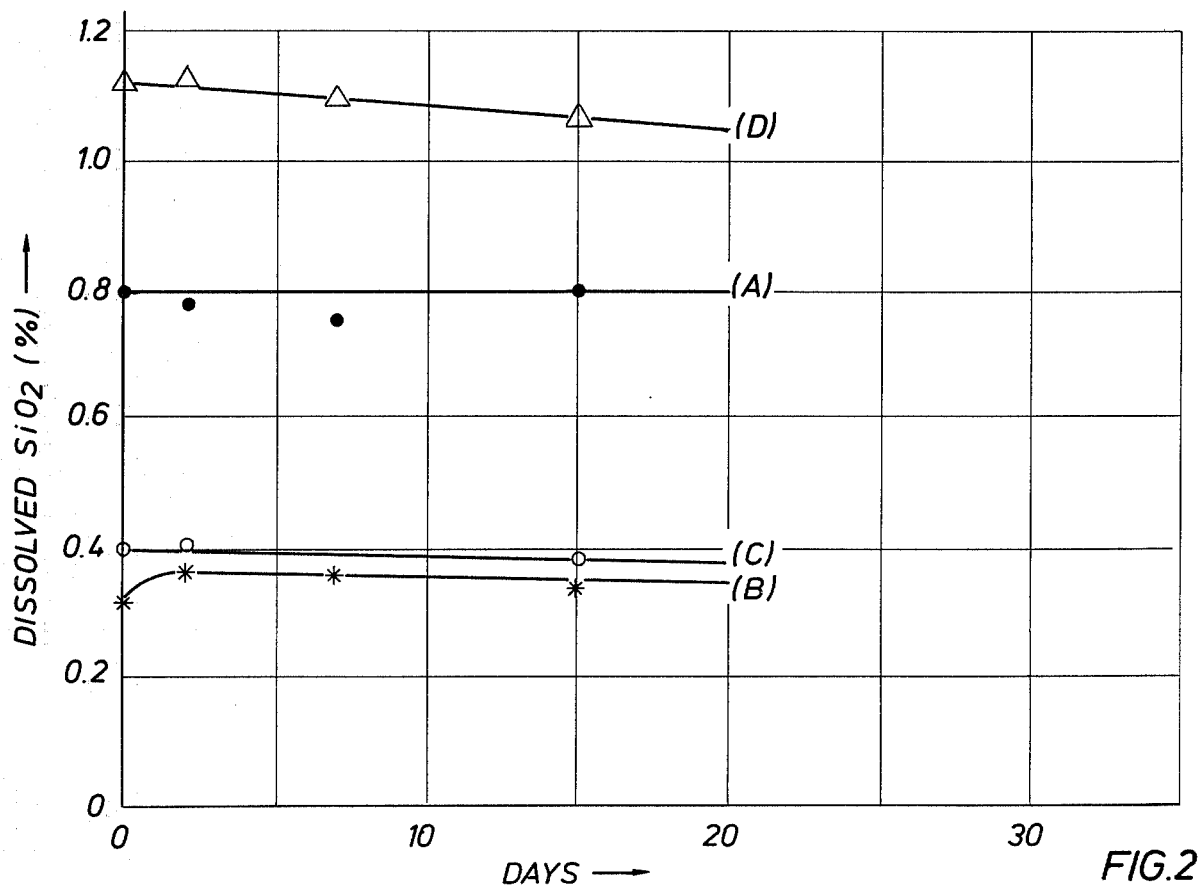
FIG. 2 shows similar plots regarding various aqueous silicate solutions at 65° C.

FIG. 2 shows a plot of the concentration of dissolved sodium silicate in each of the solutions A to D (listed in Table 1) with time in static bottle tests at 65° C. It is apparent that at that temperature the concentration of solutions A and C remained essentially unchanged while that of solution B increased slightly and that of solution D gradually decreased.

Figure 3:
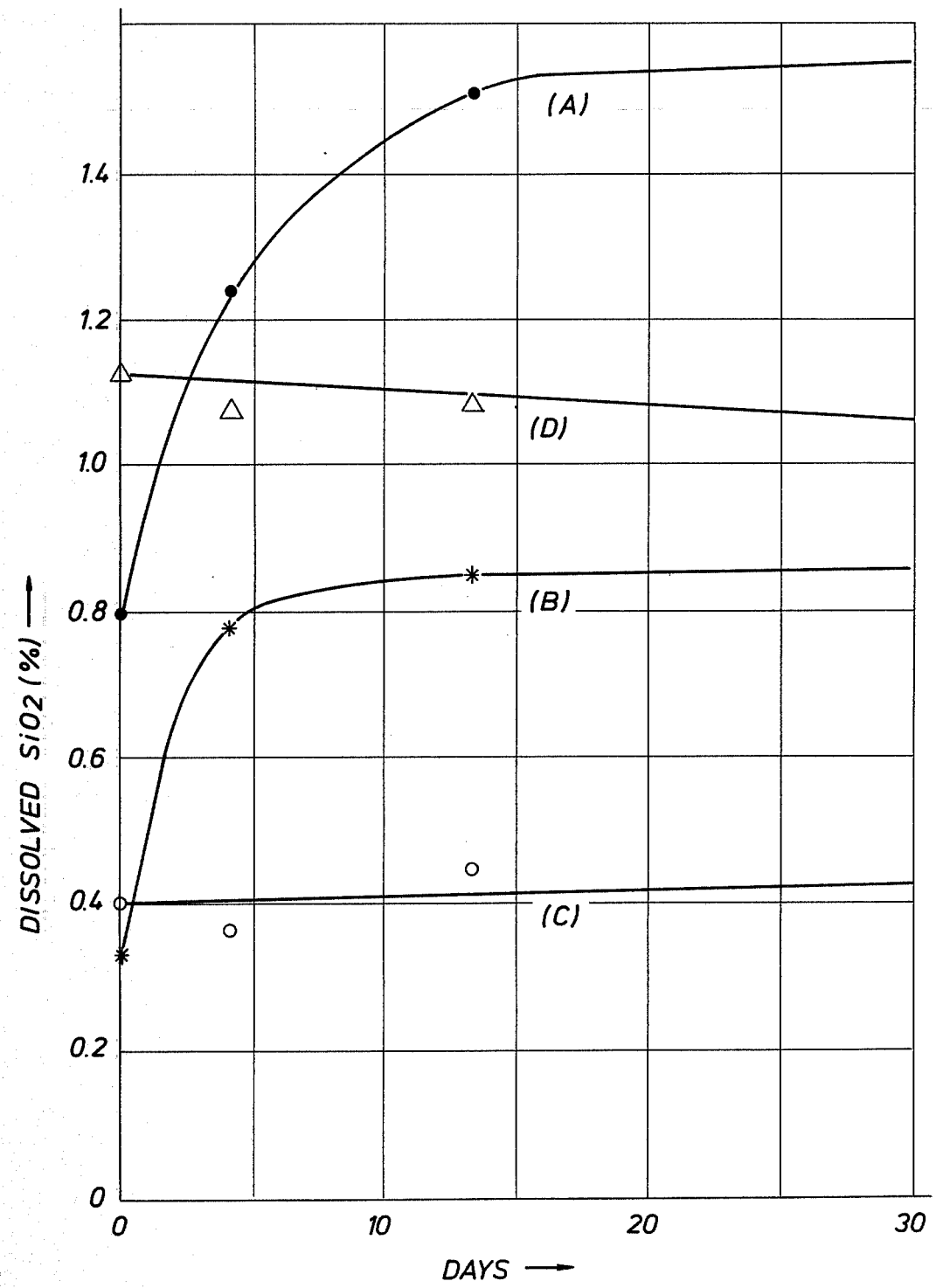
FIG. 3 shows similar plots regarding the same silicate solutions at 107° C.

FIG. 3 shows a plot of similar data from similar tests at 107° C. It is apparent that at this temperature the concentration of the solutions A and B significantly increased while that of C increased only slightly and that of D decreased slightly.

Figure 4:
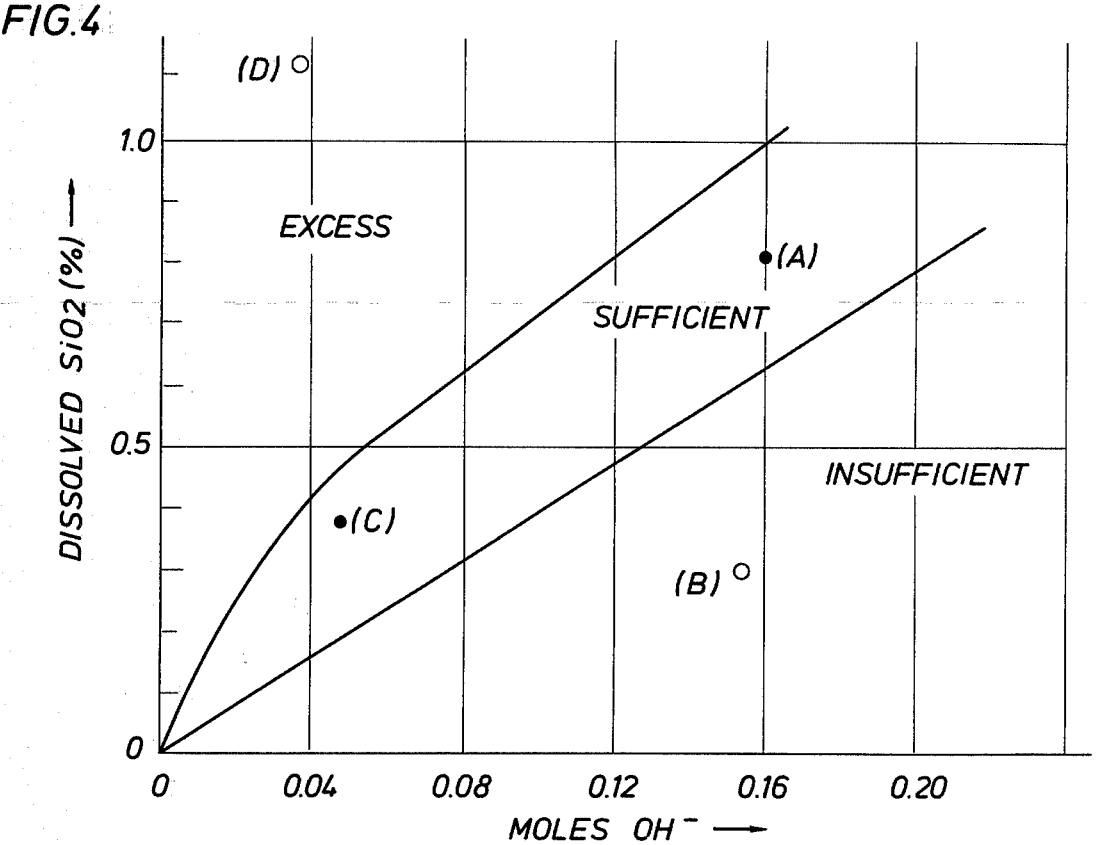
FIG. 4 shows a plot of the correlations between the concentration of dissolved silicon expressed as $SiO_2$, hydroxide ion, and equilibrium conditions with respect to dissolving silica for such solutions at 65° C.
Figure 5:
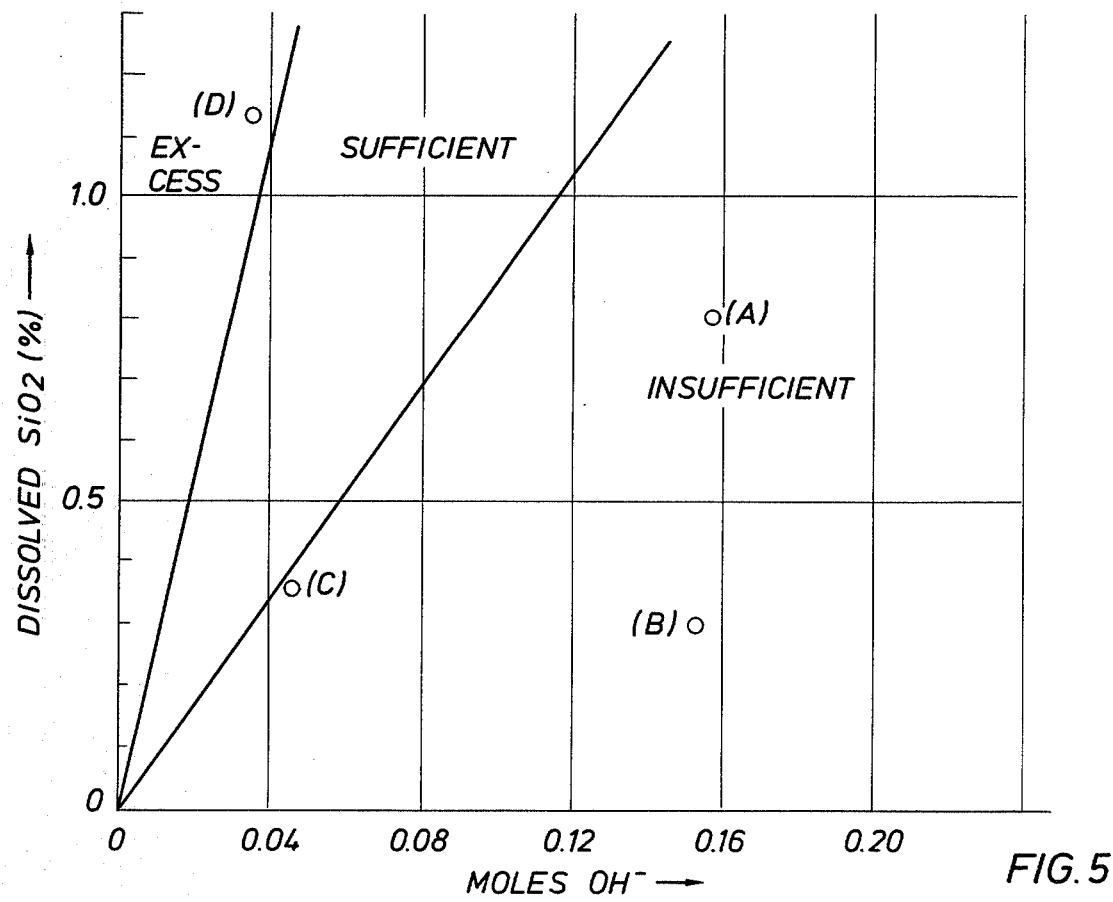
FIG. 5 shows a plot of the same correlations for the same solutions at 107° C.

FIGS. 4 and 5 show the correlations between percent dissolved silica (thus, concentration of sodium silicate) and pH (thus, concentration of dissolved sodium hydroxide) in solutions of those materials which are in equilibrium relative to dissolving silica at, respectively, 65° C. and 107° C. The figures are divided into three regions; "excess", "sufficient" and "insufficient" relative to whether the amounts of silicon dioxide dissolved in the solutions were enough to saturate the solutions with respect to dissolving silica at, respectively, 65° C. and 107° C. The figures show that, for example, at 65° C. (FIG. 4) the amounts dissolved in solutions A and C (Table 1) were sufficient while at 107° C. those amounts were insufficient. It is evident that for a given pH more dissolved silicate is needed to suppress the dissolving of silica at a higher temperature. Such tests indicate that it may be possible to substantially eliminate near wellbore formation damage due to silica dissolution without reducing the pH of the aqueous alkaline solution to be injected.

For example, note that in solution A in which the total concentration of dissolved sodium hydroxide and sodium silicate amounts to 2.25% by weight of the solution, the pH of the solution is 13.2. But, at a temperature of 65° C. (149° F.) that solution shows substantially no dissolution of the silica.

FIG. 6 shows a plot of percent of silica dissolved in static bottle tests for both a 1 percent aqueous sodium hydroxide solution, and a 1 percent solution of sodium meta silicate in contact with a silica sand at a temperature of 167° F. It is apparent that the dissolved silicate concentration of the sodium hydroxide solution increased rapidly throughout about the first 45 days while the dissolved silicate concentration of the meta silicate solution increased very slowly throughout the total test time of about 66 days.

Table 2 shows data collected for such 1% solutions flowed through Clemtex sand packs. The dissolution of sand from the pack was determined by two methods: (1) employing the silicomolybdate colorimetric technique to determine the difference in sodium silicate concentration between injection and effluent fluids, and (2) to determining the weight loss of the sand pack directly. The two methods are expected to yield different values since the colorimetric method does not measure the contribution of colloidal particles which might be removed from the sand pack. As expected, Table 2 shows that the meta silicate solution dissolves significantly less silica. In view of this it is concluded that the results of "static bottle" tests are valid in estimating the silica dissolution tendencies of flowing alkaline solutions.

TABLE 2

| Flow Test Data 167° F. Clemtex Sand Packs | | |
|---|---|---|
| | 1% NaOH | 1% Meta Silicate |
| g SiO₂ dissolved Day (Hach color test) 20 ft/day | .0585 ± .0003 | .0068 ± .0068 |
| Wt. loss of sand pack Day | .212 g. | 0.0 |

PROCEDURES AND COMPONENTS SUITABLE FOR USE IN THE PRESENT INVENTION

The present invention is useful in displacing substantially any relatively acidic reservoir oil, such as one having an acid number of at least about 0.1 in substantially any reservoir in which siliceous materials are apt to be dissolved to an undesirable extent by an aqueous solution of an alkali metal hydroxide. The invention is particularly beneficial in such a reservoir which has a relatively high temperature.

When conducting the present process, the determinations of the reservoir temperature and reservoir oil acidity can readily be accomplished by known logging or sampling and measuring procedures. Where the invention is applied as a tertiary oil recovery method in a reservoir which is or is substantially the same as one in which primary and secondary recovery procedures have been employed, the data from prior determinations can be utilized.

The concentration of hydroxide ion (pH) needed for an aqueous alkaline solution to be capable of converting a desired proportion of the reservoir oil and petroleum acids to soaps, can be determined by measuring the residual acid number of the oil after it has been exposed to aqueous alkaline solutions of various pH's. Generally, a pH in the 10.5 to 13.5 range is required.

The need for reserve alkalinity to maintain the pH of the injected aqueous alkaline solution as hydroxide ions are consumed relates to the consumption of such ions in ionizing the petroleum acids and in reactions such as the formation of multivalent cation hydroxides, or hydroxide hydrates in the form of water insoluble precipitates or gels. The multivalent cation exchange properties of the reservoir rocks can be determined by known procedures and/or from available pre-existing information. The kind and amount of alkaline material to be employed for reserve alkalinity in a given situation is affected by numerous factors. As is known to those skilled in the art, the reserve alkaline materials may be either additional alkali metal hydroxides or water-soluble salts of weak acids, such as the alkali metal silicates, acetates, formates, polyphosphates, carbonates and the like. In a given situation the amount of reserve alkalinity to be employed increases with increases in the acid number of the reservoir oil and/or increases in the multivalent cation content of the reservoir water and/or multivalent cation exchange properties of the reservoir rock and/or increases in the distance through which the aqueous alkaline solution and the reservoir oil are to be displaced through the pores of the reservoir.

The determination of the concentration of alkali metal silicate needed in an aqueous solution containing the desired concentrations of alkali metal hydroxide and reserve alkaline material to be injected into the reservoir for causing the solution to maintain a substantially unchanged concentration of dissolved alkali metal silicate when the solution is in contact with undissolved silica at the reservoir temperature should be based on tests of such a solution (preferably containing all components to be injected into the reservoir) at such a temperature. Fortunately, such tests can be made by simply mixing the solution with particulate silica or sand, maintaining the mixture at reservoir temperature, and periodically sampling and analyzing the solution. If the measured changes in the concentration of dissolved alkali metal silicate (thus, the concentration of dissolved silica) remains substantially constant for several days, the concentration used is substantially the needed concentration.

As described in the above identified copending application, Ser. No. 411,779, it is particularly advantageous to include cosurfactants and water-thickening materials in the aqueous alkaline solution to be injected. As mmore completely described in that copending application, the disclosures of which are incorporated herein by reference, selection of the kinds and amounts of such materials involves selecting and adjusting the concentration of a cosurfactant material relative to factors such as the total electrolyte concentration of the solution to be injected, the kind and amount of petroleum acids contained in the reservoir oil, and the kind and amount of electrolytes which will become dissolved in the injected solution within the reservoir. The selections are arranged so that the solution to be injected has an alkalinity, salinity and preformed cosurfactant content capable of causing the salinity of the surfactant system which will be formed within the reservoir (by the interaction of the solution with the reservoir oil) to substantially equal the salinity requirement for minimizing the interfacial tension between that solution and the reservoir oil.

When cosurfactants and water-thickening materials are to be included in the aqueous alkaline solution to be injected into the reservoir in accordance with the present process, the determination of the concentration of dissolved alkali metal silicate needed to substantially equilibriate the system with respect to dissolving silica in the reservoir should be made with respect to a solution containing those materials.

An aqueous liquid solution consisting essentially of water, hydroxide ions, some form of soluble silicate, reserve alkalinity (which may or may not be silicate) and optionally surfactants, water-thickening materials with attendant additives to inhibit degradation, corrosion, etc. is then compounded, or blended, and injected into the reservoir. The compounding and injection can readily be effected by means of conventional devices and techniques.

What is claimed is:

1. A process for preparing an aqueous alkaline solution to be injected into a relatively hot subterranean reservoir to displace relatively acidic oil within pores of the reservoir without dissolving a significant proportion of siliceous solids from within the borehole or reservoir comprising:
   determining the reservoir temperature and the minimum pH needed to convert most of the petroleum acids in the reservoir oil to alkali metal soaps;
   determining the alkalinity required to satisfy the consumption of alkalinity due to chemical reactions with the reservoir oil, brine and mineral materials in the reservoir exclusive of the consumption due to silica dissolution;

determining the concentration and alkali metal oxide to silicon dioxide ratio of alkali metal silicate needed to (1) provide said minimum pH, (2) satisfy said consumption of alkalinity due to reactions other than silica dissolution, and (3) reduce silica dissolution at the reservoir temperature; and preparing an aqueous solution to be injected into the reservoir which consists essentially of water and said determined alkali metal oxide to silicon dioxide ratio of alkali metal silicate.

2. The process of claim 1 in which said determinations are made with respect to an aqueous alkaline solution containing cosurfactants and/or mobility controlling materials.

3. The process of claim 1 in which said determination of the concentration and composition of alkali metal silicate is made by maintaining a solution containing at least one concentration and composition in substantially static contact with undissolved silica at the reservoir temperature and periodically measuring the dissolved silicate concentration of the solution.

4. The process of claim 1 in which the aqueous alkaline solution to be injected into the reservoir is foamed by dissolving water-soluble alkali metal silicate and alkali metal hydroxide in an aqueous liquid.

* * * * *